United States Patent [19]

Kawai

[11] Patent Number: 5,107,343
[45] Date of Patent: Apr. 21, 1992

[54] INFORMATION SEARCHING SYSTEM FOR IMAGE DATA

[75] Inventor: Toshihiko Kawai, Tokyo, Japan
[73] Assignee: Sony Corporation, Tokyo, Japan
[21] Appl. No.: 599,999
[22] Filed: Oct. 19, 1990

[30] Foreign Application Priority Data

Oct. 20, 1989 [JP] Japan .................. 1-273487

[51] Int. Cl.⁵ .............................. H04N 5/91
[52] U.S. Cl. ............................ 358/341; 358/335; 360/35.1
[58] Field of Search ............... 358/310, 335, 341, 342, 358/343, 906, 909, 311, 22, 183, 182; 360/55, 137, 14.1, 35.1; 369/34, 29, 30, 24, 32, 47, 13, 14

[56] References Cited

U.S. PATENT DOCUMENTS

| | | | |
|---|---|---|---|
| 4,647,989 | 3/1987 | Geddes | 369/30 |
| 4,667,802 | 5/1987 | Verduin et al. | 369/34 |
| 4,703,465 | 10/1987 | Parker | 369/30 |
| 4,740,938 | 4/1988 | Bierhoff et al. | 369/30 |

FOREIGN PATENT DOCUMENTS

| | | |
|---|---|---|
| 0265167 | 4/1988 | European Pat. Off. . |
| 2517863 | 10/1983 | France . |
| 2602352 | 2/1988 | France . |
| 60-134679 | 7/1985 | Japan . |
| 61-148689 | 7/1986 | Japan . |
| 2168191A | 6/1986 | United Kingdom . |
| 2208142 | 3/1989 | United Kingdom . |
| 2210724 | 6/1989 | United Kingdom . |

OTHER PUBLICATIONS

"The compact disk ROM: applications software", IEEE Spectrum, Apr. 23, 1986, No. 4, pp. 49–54.
"Faszination Compact Disc", 202 Funkschau, Aug. 26, 1988, No. 18, pp. 36–39.
"Interaktives Video", 8195 Fernseh-und Kino Technik, Aug. 1985, No. 8, pp. 377–383.

Primary Examiner—Roy N. Envall, Jr.
Assistant Examiner—Thai Tran
Attorney, Agent, or Firm—Hill, Van Santen, Steadman & Simpson

[57] ABSTRACT

An information searching system for image data arranged such that a character or symbol is utilized as a key word for a still picture or real moving picture in order to display a still picture or real moving picture associated with a piece of music on the basis of, for example, a musical title of the music.

10 Claims, 8 Drawing Sheets

FIG. 3A

Singer Name Table NART

| Singer Name Ni | Singer Code ni |
|---|---|
| N1 | 1 |
| N2 | 2 |
| N3 | 3 |
| --- | --- |
| MARINA WATANABE | 1 2 3 |
| MISATO WATANABE | 1 2 4 |

FIG. 3B

Album Name Table ALBM

| Album Name $A_j$ | CD Number $C_j$ | Album Release Date $B_j$ | Album Code $a_j$ |
|---|---|---|---|
| A1 | C1 | B1 | 1 |
| A2 | C2 | B2 | 2 |
| A3 | C3 | B3 | 3 |
| --- | --- | --- | --- |
| MARINA | 32·8H105 | Feb. 26, 1987 | 2 3 4 |

FIG. 3C

Musical Title Table TITL

| Musical Title | Tk | Musical Title Code | tk |
|---|---|---|---|
| T₁ | | 1 | |
| T₂ | | 2 | |
| T₃ | | 3 | |
| ------- | | ------- | |
| HOLIDAY VISITOR | | 3 4 5 6 | |

FIG. 3D

Singer Searching Table NAST
(Table of ni = 123)

| Album Code | aj | Jacket Address | Jj |
|---|---|---|---|
| 2 3 4 | | J₁ | |
| 4 2 3 | | J₂ | |
| 5 6 7 | | J₃ | |
| ------- | | ------- | |

FIG. 3E

Album Searching Table ALST
(Table of aj=123)

| Musical Title Code tk | Address of Digital Audio Data Sk | Address V of Real Moving Picture Vk |
|---|---|---|
| 3 4 5 6 | S₁ | V₁ |
| 3 4 5 7 | S₂ | V₂ |
| 3 4 5 8 | S₃ | V₃ |
| --- | --- | --- | form# INFORMATION SEARCHING SYSTEM FOR IMAGE DATA

BACKGROUND OF THE INVENTION

1. Field of the Invention

The present invention generally relates to an information searching system and, more particularly, to an information searching system for image data in which characters and symbols are utilized as key words of a still picture and a real moving picture, whereby a still picture and a real moving picture associated with a piece of music can be 10 displayed from, for example, a musical title.

2. Description of the Prior Art

In a case of still picture and sound, if the still picture video signal and the audio signal thereof are converted into the form of digital signals, the amount of data is reduced. Therefore, these data can be stored in a CD-ROM (i.e., compact-disc read only memory) or in a hard disc and can be read out therefrom, when necessary. In the case of a real moving picture, the amount of information thereof is too much. Therefore, it is very difficult to arrange a system in which data of a real moving picture are stored in the inside of a computer and then utilized. For this reason, the data of real moving picture must be stored in and read out from an external storage medium such as a laser disc, a video tape or the like.

OBJECTS AND SUMMARY OF THE INVENTION

Accordingly, it is an object of the present invention to provide an improved information searching system for image data in which the aforenoted shortcomings and disadvantages of the prior art can be eliminated.

More specifically, it is an object of the present invention to provide an information searching system for image data in which video images of desired real moving picture and still picture can be searched and obtained by using a character or a symbol as a key word.

It is another object of the present invention to provide an information searching system for image data in which a compact disc and a laser disc can be organically and effectively combined, to be utilized as a highly sophisticated data base.

It is a further object of the present invention to provide an information searching system for image data in which when a CD-ROM is used alone, this CD-ROM can be utilized as a standard data base.

According to a first aspect of the present invention, an information searching system for image data is comprised of a real moving picture record medium in which a real moving picture information and an audio information corresponding to the real moving picture information are recorded, a real moving picture reproducing apparatus for reproducing the real moving picture information and the audio information from the real moving picture record medium, a still picture record medium in which list information, audio information corresponding to one portion of the list information and still picture information are recorded, a still picture reproducing apparatus for reproducing the audio information and the still picture information from the still picture record medium, display apparatus for displaying an index mark to access audio information and video image information from the real moving picture record medium and the still picture record medium in response to a desired item of the list information, and a selective control apparatus for selecting the index mark on a display screen of the display apparatus to access the selected information, wherein the information of the index mark is one portion of the list information and an information corresponding to the real moving picture information is recorded on the still picture record medium.

According to a second aspect of the present invention, an information searching system for image data is comprised of a real moving picture record medium in which real moving picture information and audio information corresponding to the real moving picture information are recorded, a real moving picture reproducing apparatus for reproducing the real moving picture information and the audio information from the real moving picture record medium, a still picture record medium in which list information, audio information and still picture information corresponding to one portion of the list information are recorded, a still picture reproducing apparatus for reproducing the audio information and the still picture information from the still picture record medium, a display apparatus for displaying an index mark to access audio information and video image information from the real moving picture record medium and the still picture record medium in response to a desired item of the list information, and a control apparatus for searching the audio information and the video image information on the basis of the list information. In this case, the control apparatus includes a circuit for obtaining an input search item, a circuit for looking up a table on the basis of the search item, a circuit for converting the list information into a display signal on the basis of the table, a circuit for judging whether or not the displayed list information is selected, and a circuit for searching the real moving picture information, the still picture information and the audio information on the basis of the judgement done by the judging circuit.

The preceding, and other objects, features and advantages of the present invention will be apparent in the following detailed description of a preferred embodiment 10 when read in conjunction with the accompanying drawings, in which like reference numerals are used to identify the same or similar parts in the several views.

BRIEF DESCRIPTION OF THE DRAWINGS

FIGS. 3A to 3E are schematic diagrams of tables used in the present invention, and to which reference will be made in explaining the operation of the present invention, respectively.

DETAILED DESCRIPTION OF THE PREFERRED EMBODIMENT

An embodiment of an information searching system for image according to the present invention will now be described with reference to the accompanying drawings.

In this embodiment, data to be searched are an album name of a compact disc (CD), a singer name and a musical title of music recorded in the CD, and the aforenoted data are written in a CD-ROM. Further, in this embodiment, media in which a real moving picture is stored and an apparatus for reproducing such media are a laser disc and a laser disc player, respectively.

Figure 1:
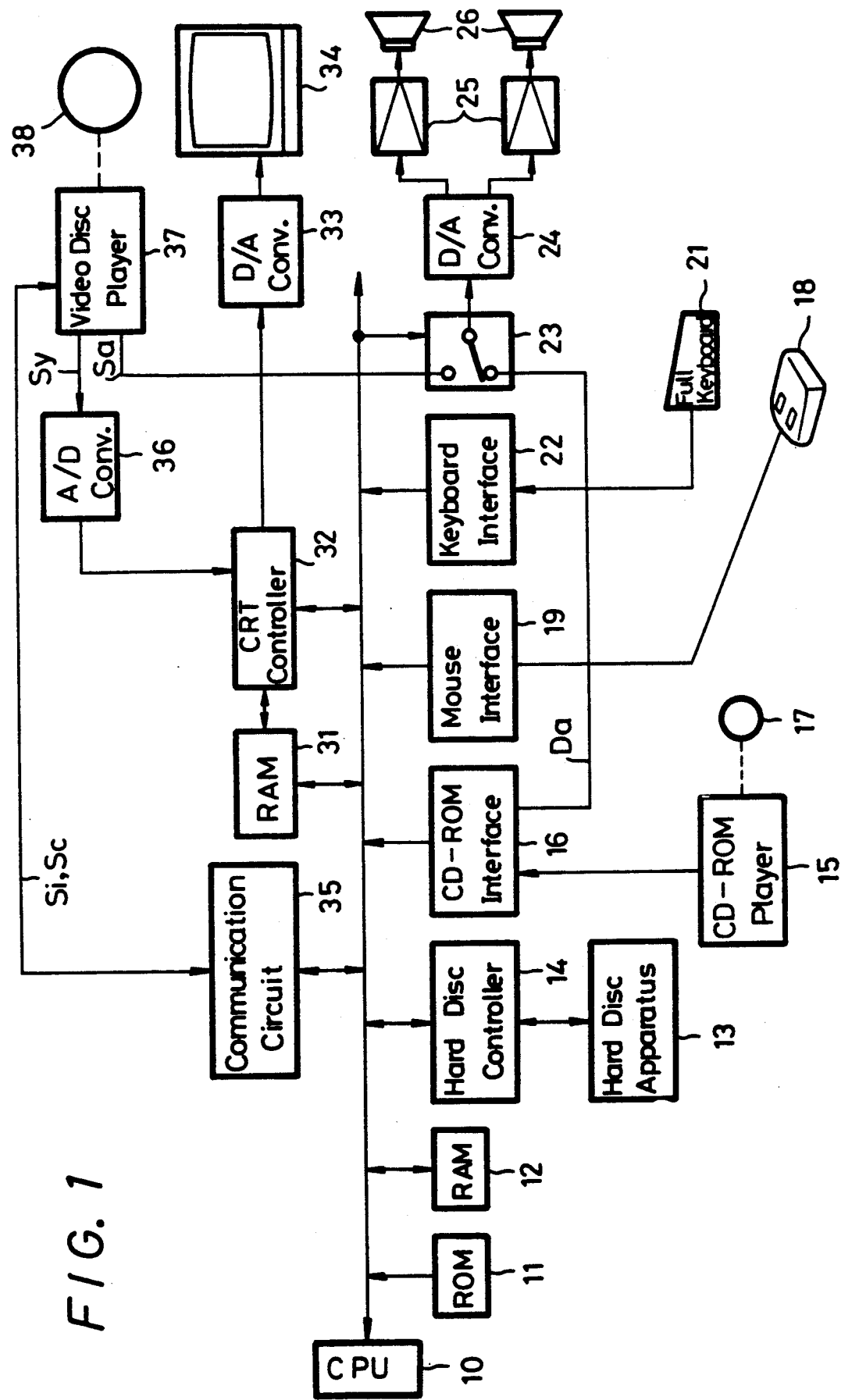
FIG. 1 is a block diagram showing an embodiment of an 15 information searching system for image data according to the present invention.

FIG. 1 shows an overall arrangement of the information searching system for image of the present invention. In FIG. 1, reference numeral 10 designates a central processing unit (CPU), 11 a read only memory (ROM) in which various programs are written, 12 a random access memory (RAM) for a work area, 13 a hard disc apparatus and 14 a hard disc controller. The hard disc apparatus 13 installs therein an image searching routine 40, such as shown in the flow chart of FIG. 2.

Reference numeral 15 designates a CD-ROM player, 16 a CD-ROM interface made according to, for example, the small computer system interface (SCSI) standard, 17 a CD-ROM (or CDI), 18 a mouse and 19 a mouse interface, respectively.

In this case, data is read out (i.e., reproduced) from the CD-ROM 17 via the CD-ROM player 15 and the CD-ROM interface 16. In the CD-ROM 17, data table NART, ALBM, TITL, NAST, ALST (described more fully later) and so on shown in, for example, FIG. 3 are written as list information. Further, in the CD-ROM 17, there are written digital audio data Da of some music and digital video data Ds which provide still images of jackets.

The number of music pieces and jackets recorded in the CD, as the digital audio data Da and the digital image data Ds, is determined by the storage capacity (e.g., 540 Megabytes at maximum) of the CD-ROM 17. Accordingly, the corresponding data Da and Ds are not always recorded for all music data recorded in the CD-ROM 17.

In FIG. 1, reference numeral 21 designates a full keyboard, 22 a keyboard interface, 24 a digital-to-analog (D/A) converter, 25 stereo amplifiers, and 26 speakers. During a predetermined mode, the audio data Da from the CD-ROM 17 is supplied through a switch circuit 23 to the D/A converter 24.

Further, in FIG. 1, reference numeral 31 designates a random access memory (RAM) for storing an image, 32 a cathode ray tube (CRT) controller, 33 a D/A converter, 34 a display apparatus such as a CRT display, 35 a communication circuit made according, for example, to the RS-232C standard, 36 an analog-to-digital (A/D) converter, 37 a laser disc player and 38 a laser disc.

The CRT controller 32 controls various kinds of image data to perform a predetermined display. That is, in a predetermined mode, data stored in the RAM 31 is read out therefrom as a digital video signal under the control of the CRT controller 32. Then, this read-out digital video signal is converted into an analog video signal by the D/A converter 33 and is then supplied to the display apparatus 34, thereby being displayed as an image.

The laser disc player 37 is set in a predetermined mode, such as, playback mode, stop mode and so on in response to a control signal Sc from the communication circuit 35. Also, the laser disc player 37 can reproduce a video signal Sy and a digital audio signal Sa of a picture corresponding to an index number from the laser disc 38 in accordance with an index signal (i.e., address signal) Si from the communication circuit 35.

This video signal Sy is supplied through the A/D converter 36 to the CRT controller 32 so that, in a predetermined mode, this video signal Sy is supplied from the CRT controller 32 through the D/A converter 33 to the display apparatus 34. During the predetermined mode, the digital audio signal Sa, reproduced by the laser disc player 37, is supplied through the switch circuit 23 to the D/A converter 24.

The tables NART to ALST will be described next with reference to FIGS. 3A to 3E.

The table NART is a singer name table in which names Ni of singers (or players) and singer codes ni assigned to the singers are stored. As shown in FIG. 3A, for example, "123" is assigned to a singer "Marina Watanabell" as the singer code ni.

As shown in FIG. 3B, the table ALBM is an album name table in which there are stored album names (names of CD albums) Aj, CD numbers Cj of the albums, dates of album release Bj and album codes aj assigned to the albums. For example, the CD number and date of release of the album "MARINA" are "32. 8H105" and "Feb. 26, 1987" and, "234" is assigned to this album "MARINA" as the album code aj.

As shown in FIG. 3C, the table TITL is a musical title table in which there are stored musical titles Tk and music codes tk assigned to the music pieces. For example, as shown in FIG. 3C, "3456" is assigned to music "HOLIDAY VISITOR" as the music code tk.

As shown in FIG. 3D, the table NAST is a singer searching table prepared for each of the singers, and in which there are stored album codes aj of albums Aj and jacket addresses Ji made by the singer Ni. In the example of FIG. 3D, the table NAST is the table NAST (ni=123) in which the singer is "Marina Watanabell" whose singer code is ni=123.

In this table NAST, when "Jj≠0, the digital image data Ds of the still picture of the jacket of the album Aj to which the code aj is assigned is recorded in the CD-ROM 17 and this means that the address thereof is Tj. When Tj=0, this means that such digital image data Ds is not recorded in the CD-ROM 17.

Further, as shown in FIG. 3E, the table ALST is an album searching table prepared for each of the albums. More precisely, in this table ALST, there are stored musical title code tk, address Sk of the digital audio data Da and address Vk of the video signal Sy of music Tk recorded in the album Aj. The example of FIG. 3E illustrates the table ALST (aj=234) of the album "MARINA" where aj=234.

In this table ALST, when Sk≠0, the digital audio data Da of the music Tk to which the code tk is assigned is recorded in the CD-ROM 17, and this means that the address is Sk. When Sk=0, this means that the above-mentioned digital audio data Da is not recorded in the CD-ROM 17.

This is also true for the address Vk. When Vk≠0, the video signal Sy and the digital audio signal Sa of the music Tk to which the code tk is assigned are recorded on the laser disc 38 and this means that the address thereof is Vk. When Vk=0, this means that the video signal Sy and the digital audio signal Sa are not recorded on the laser disc 38 at all.

Although various kinds of tables necessary for searching are recorded in the CD-ROM 17 in addition to the aforenoted tables NART to ALST, these will not be described herein. Further, the data amount of these tables NAST to ALST is about 1 percent of the whole storage capacity of the CD-ROM 17, considering the data amount of these tables of one record company.

Accordingly, substantially the whole storage capacity of the CD-ROM 17 can be assigned to the digital audio data Da of music Tk or to the digital image data Ds of the still picture on the CD jacket. A ratio in which the capacity of the CD-ROM 17 is assigned to the digital audio data Da and the digital image data Ds can be determined freely.

Music pieces recorded in the laser disc 38 are selected in response to the contents of the CD-ROM 17, or the address Vk of the CD-ROM 17 is determined in response to music pieces recorded in the laser disc 38. For this reason, unavoidably, the contents of the laser disc 38 tend to include some special cases. In such case, the laser disc 38 may be formed as a write-once type disc (i.e., WO-type disc).

Data is searched by executing the routine 40 by the CPU 10 as follows. In the following description, the searching item is "singer name" and the key word thereof is "Marina Watanabe".

Figure 2:
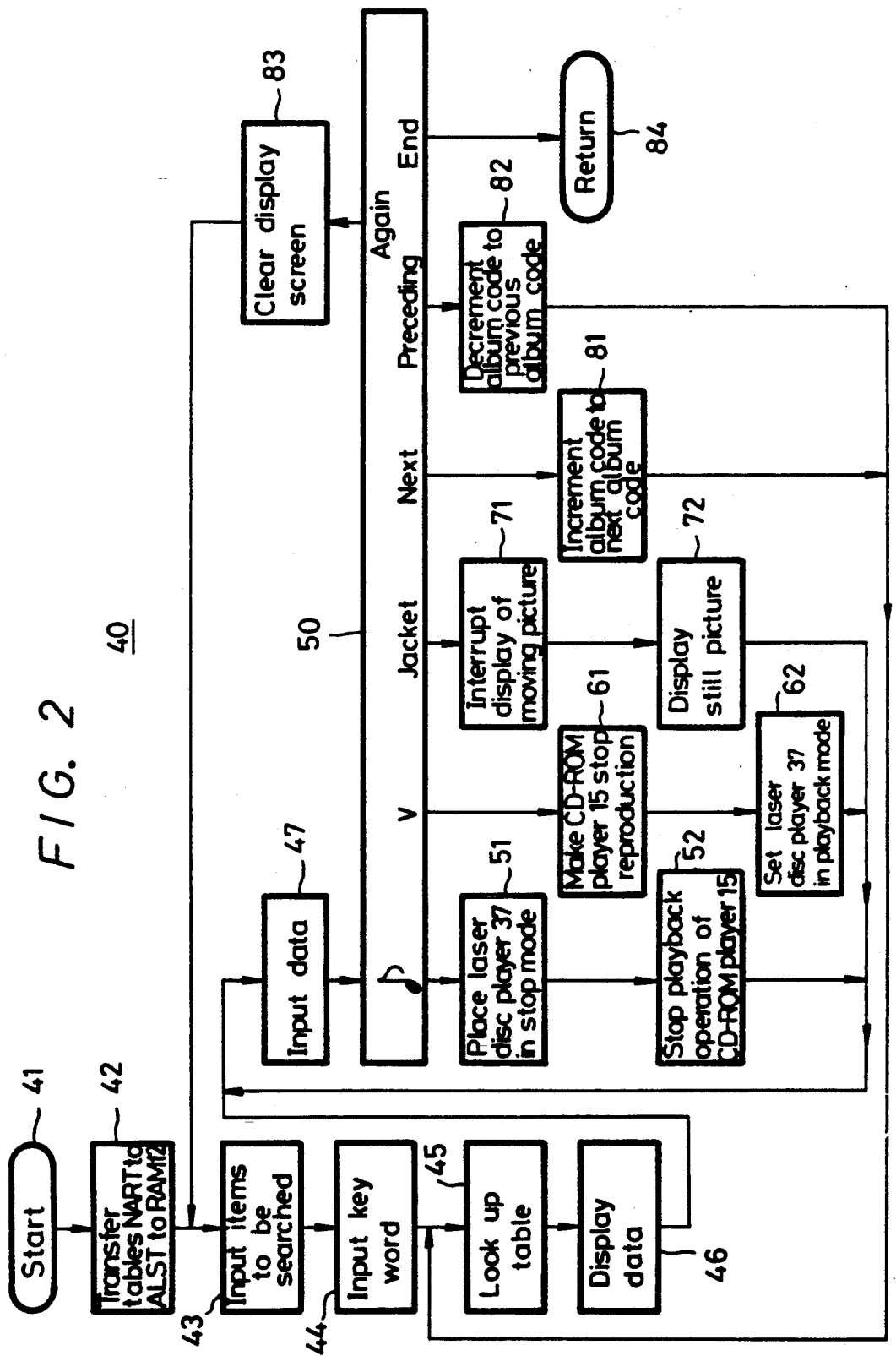
FIG. 2 is a flow chart to which reference will be made in explaining an operation of the present invention.

Referring to FIG. 2, the processing by the CPU 10 is started from step 41 in the routine 40. In the next step 42, the tables NART to ALST stored in the CD-ROM 17 are read out therefrom and transferred to the RAM 12. In the next step 43, data of initial picture is written in the RAM 31 and this data is read out from the RAM 31 as a video signal by the CRT controller 32. This video signal is supplied through the D/A converter 33 to the display apparatus 34 so that the initial picture is displayed on the display apparatus 34.

On the initial picture, there exist item names to be searched such as "singer name", "album name" and the like. In step 43, the CPU 10 is placed in the standby mode for awaiting commands indicating the search item.

When an icon (not shown) of "singer name" is clicked by the mouse 18 as the search item, the processing proceeds from step 43 to step 44, and in step 44, the CPU 10 is placed in the standby mode for awaiting the input of a key word. Under this condition, if "Marina Watanabe" is inputted as the key word by the keyboard 21, then the processing proceeds from step 44 to step 45.

In step 45, the following table processing is carried out.

With reference to the table NART, the key word, "Marina Watanabe" is converted into the singer code ni, in that case, ni=123.

Then, of the tables NAST, table NAST (ni=123) of the code ni=123 is selected, and the first album code aj=234 is accessed from the album codes aj of this table NAST.

Then, the user looks up the table ALBM by utilizing the album code aj=234, and album name Aj, in that case, album name "MARINA" is accessed.

At that time, CD number Cj and album release date Bj, in that case, "32. 8H105" and "Feb. 26, 1987" are accessed from the table ALBM together with album name Aj and address Jj corresponding to the code (aj=234) is accessed from the table NAST (ni=123).

Further, a table ALST (aj=234) is selected from the tables ALST by the code aj and the user looks up the table TITL by utilizing the song name code tk registered in this table ALST (aj=234). Then, the song name code tk registered in the table ALST (aj=234) is converted to song name TK and delivered.

Furthermore, at that time, addresses Sk and Vk are generated at every song name code tk (i.e., at every song name code tk because the code tk corresponds to the song name Tk in a one-to-one relation on the basis of the table TITL) on the basis of the table ALST (aj=234).

After the aforenoted processings are executed, the processing proceeds from step 45 to step 46. In step 46, display data is formed in accordance with the data thus derived at step 45 and is then fed to the RAM 31.

Figure 4A:
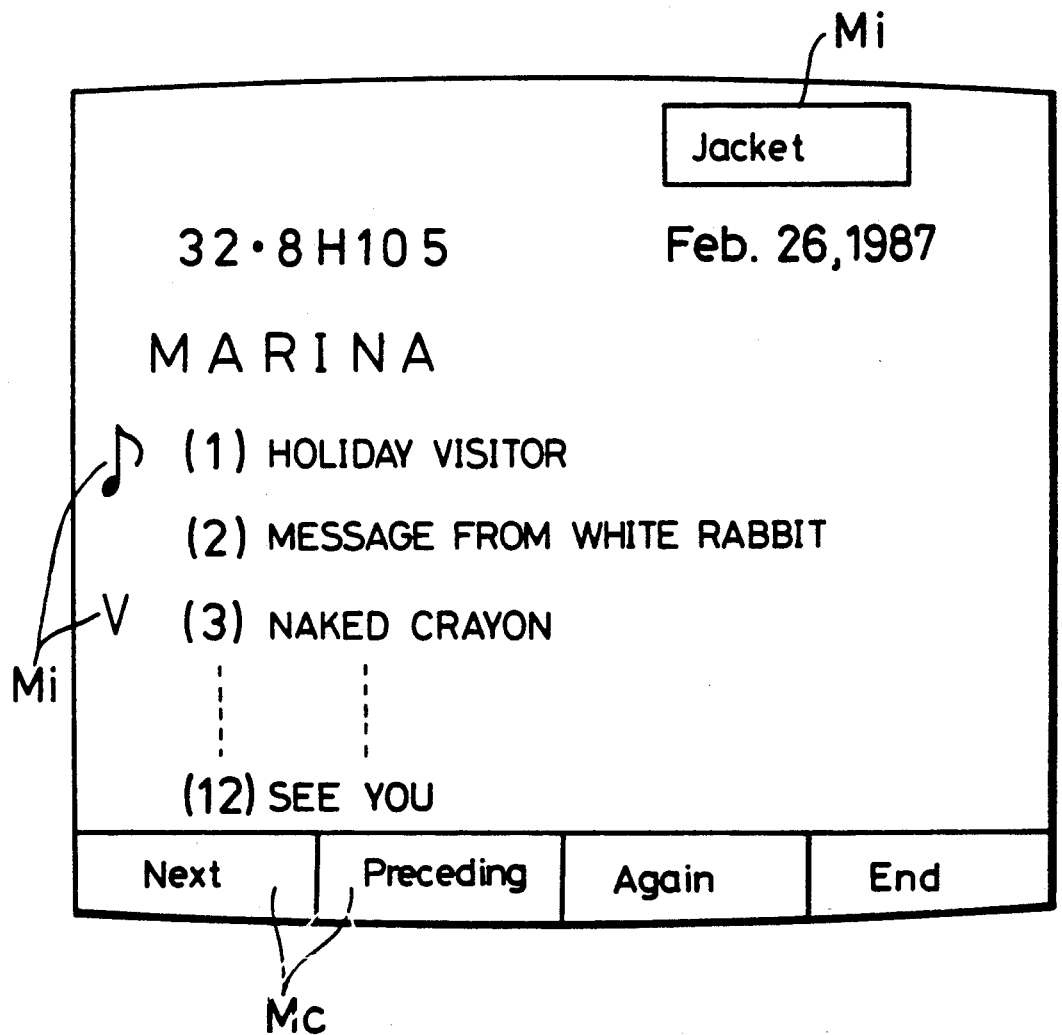
FIGS. 4A to 4C are schematic diagrams showing examples of pictures displayed on a display screen of a display 25 apparatus used in the present invention, and to which reference will be made in explaining the operation of the present invention.

Therefore, in accordance with the data generated in step 45, the display apparatus 34 displays thereon CD number and album release date of the album "MARINA" of "MARINA WATANABE" and musical titles of music pieces recorded in this album in the form of a list information display as shown in, for example, FIG. 4A.

At that very moment, an index mark Mi is simultaneously displayed in accordance with the addresses Ji, Sk and Vk generated at step 45. That is, when Jj≠0, the still picture video image data Ds of the CD jacket is recorded in the address Jj of the CD-ROM 17 so that, as shown in FIG. 4A, word "JACKET" is displayed on one portion of the display screen as the index mark Mi in order to indicate that the video image data Ds is recorded. When Jj=0, "JACKET" is not displayed on the picture screen at all. Further, when Sk≠0, digital audio data Da of the corresponding music is recorded on the address Sk of the CD-ROM 17 so that, as shown in FIG. 4A, a "musical note" mark is displayed, for example, at the starting portion of the musical title of corresponding music as the index mark Mi, in order to indicate the existence of such recording. When Sk=0, the "musical note" mark is not displayed thereon at all.

Furthermore, when Vk≠0, the video signal Sy and the audio signal Sa of the corresponding music are recorded on the address Vk of the laser disc 38 so that, as shown in FIG. 4A, the character "V" is displayed, for example, at the starting portion of the musical title of the corresponding 15 music as the index mark Mi in order to indicate the existence of such recording. When Vk=0, no character "V" is displayed.

In the case of FIG. 4A, there is still picture video image data Ds of the jacket of this album "MARINA", 20 the digital audio data Da is recorded on the CD-ROM 17 for the first music piece "HOLIDAY VISITOR", and the real moving picture and the sound thereof are recorded on the laser disc 38 for the third music piece "NAKED CRAYON". Further, characters Mc such as "preceding", "next", "again" and "end" are 25 displayed on the lower part of the display screen.

After the above-mentioned display is performed, the processing proceeds from step 46 to step 47, and in step 47, the CPU 10 is set in the standby mode for awaiting the input by the mouse 18. Input by the mouse is accomplished by moving the mouse in the conventional way to move a cursor (not shown) to a selected position on the display screen, after which a push button switch on the mouse is operated or "clicked" to form a selection signal, in response to the current location of the cursor.

Accordingly, when "musical note" mark in the marks Mi is clicked by the mouse 18, the processing proceeds from step 47 to step 50. In step 50, the kind of the character or symbol clicked in step 50 is determined. In case the mark clicked is the "musical note" mark, the processing proceeds from step 50 to step 51.

In step 51, the control signal Sc is supplied through the communication circuit 35 to the laser disc player 37, whereby the laser disc player 37 is set in the stop mode regardless of the previous operation mode. Then, the processing proceeds to the next step 52, and in this step 52, the address Sk corresponding to the music of the "musical note", mark selection is supplied to the CD-ROM player 15 on the basis of the position selected by the mouse 18 in step 47 and the control signals are supplied to the CD-ROM player 15 and the CD-ROM interface 16, whereby the CD-ROM player 15 and the CD-ROM interface 16 are placed in the playback mode for reproducing the digital audio data Da. Thus, the digital audio data Da is generated from the address Sk of the CD-ROM 17 through the CD-ROM interface 16.

The digital audio data Da is supplied through the switch circuit 23 to the D/A converter 24, whereby it is converted to an analog audio signal, that is, an audio signal of music "HOLIDAY VISITOR" corresponding to the "musical note" mark. This analog audio signal is supplied through the amplifiers 25 to the speakers 26, respectively.

Accordingly, when the displayed condition is as shown in FIG. 4A, if "musical note" mark of the marks Mi is designated by or selected the mouse 18, then music of the musical title associated with the "musical note" mark is reproduced from the CD-ROM 17. At that time, the picture of FIG. 4A is displayed on the display apparatus 34 as shown.

Then, the processing returns to step 47 from step 52 and, the CPU 10 is placed in the standby mode for awaiting the input from the mouse 18. In this standby mode, if the music in the CD-ROM 17 is ended, the CD-ROM player 15 temporarily finishes the reproduction of music at this music piece.

When in step 47 the CPU 10 is set in the standby mode for awaiting the input from the mouse 18, if the "V" mark of the marks Mi is selected by being clicked by the mouse 18, the processing proceeds from step 47 to step 50. In step 50, the kind of character or symbol clicked is identified and in the case the "V" mark is clicked, the processing proceeds from step 50 to step 61.

In step 61, a control signal is supplied to the CD-ROM player 15 and the CD-ROM interface 16, whereby the CD-ROM player 15 and the CD-ROM interface 16 are placed in the mode for stopping the reproduction of the audio data DA regardless of the previous operation mode. Then, the processing proceeds to step 62, and in this step 62, the address Vk corresponding to the music associates with the "V" mark selection is supplied through the communication circuit 35 to the laser disc player 37 as the index signal Si on the basis of the position selected by the mouse 18 in step 47, and the control signal Sc is also supplied to the laser disc player 37, whereby the laser disc player 37 is set in the playback mode. Thus, the video signal Sy and the digital audio signal Sa are reproduced from the address Vk of the laser disc 38.

The reproduced video signal Sy is supplied through the signal line of the A/D converter 36, the CRT controller 32 and the D/A converter 33 to the display apparatus 34, whereas the signal Sa reproduced from the laser disc 38 is supplied through the signal line of the switch circuit 23, the D/A converter 24 and the amplifiers 25 tc the speakers 26.

Figure 4B:
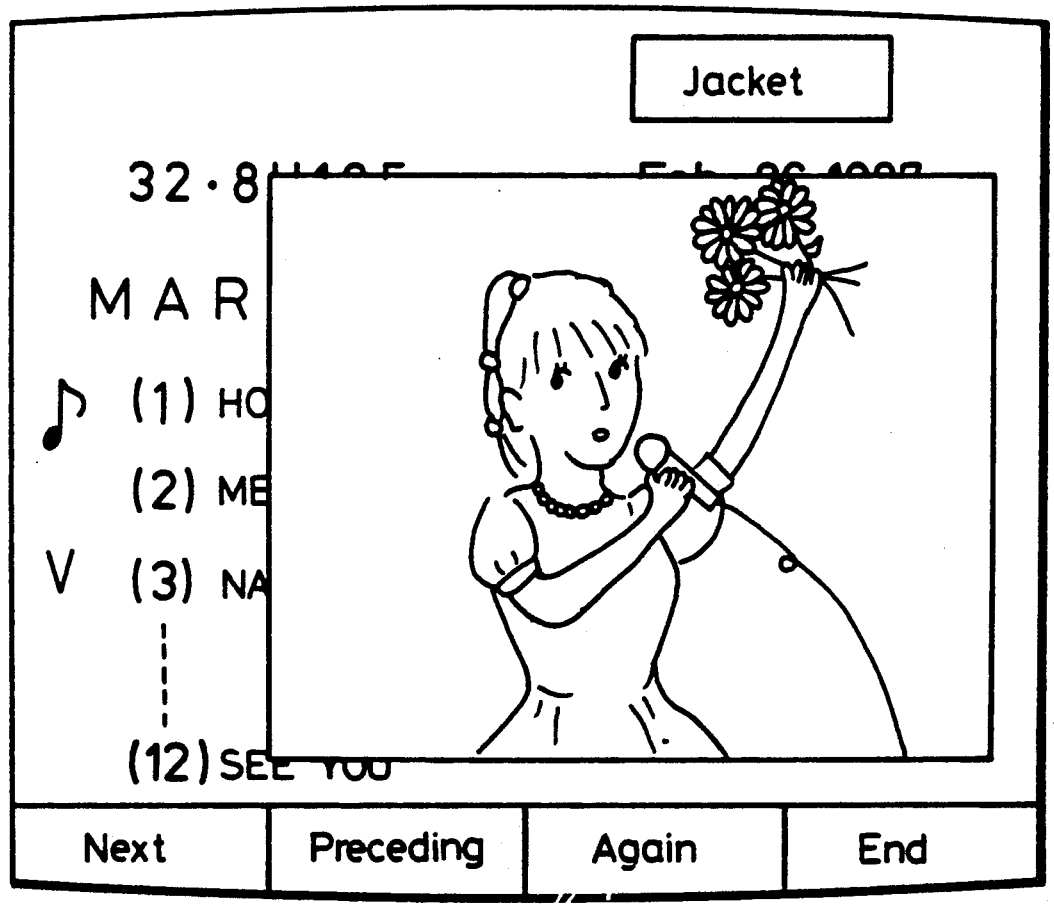

Accordingly, when the display condition is as shown in FIG. 4A, if the "V" mark of the marks Mi is designated by the mouse 18, the real moving picture and the sound of the music of musical title attached with the "V" mark are reproduced from the laser disc 38, whereby the real moving picture is displayed on the picture screen of the display apparatus 34 as, for example, shown in FIG. 4B and the sound accompanying with the real moving picture is emanated from the speakers 26.

Then, the processing returns from step 62 to the step 47 in which the CPU 10 is set in the standby mode for awaiting the input from the mouse 18. In the input standby mode, if the music on the laser disc 38 is completed, the laser disc player 37 ends the reproduction of music at this 20 music piece for the present and the picture screen of the display apparatus 34 is returned to the condition shown in FIG. 4A.

Further, when the CPU 10 is set in the standby mode for awaiting the input from the mouse 18 in step 47, if the "JACKET" mark of the marks Mi is clicked by the mouse 18, the 25 processing proceeds from step 47 to step 50. In step 50, the kind of character or symbol thus clicked by the mouse 18 is identified, and in the case the character clicked by the mouse 18 is the "JACKET" mark the processing proceeds from step 50 to step 71.

In step 71, the CRT controller 32 is placed in the display mode of FIG. 4A regardless of the previous mode of the laser disc player 37. Accordingly, if the real moving picture and the sound are reproduced from the laser disc 38 at the time point of step 71, the display of the real moving picture is interrupted but the output of sound is not interrupted. Similarly, if the sound is reproduced from the CD-ROM 17, the reproduction of that is never interrupted.

Then, the processing proceeds from step 71 to step 72, and in step 72, the address Jj is supplied to the CD-ROM player 15 and the CD-ROM interface 16, whereby the CD-ROM player 15 and the CD-ROM interface 16 are placed in the playback mode for reproducing the still picture digital video image data Ds. Thus, the video image data Ds is generated from the address Jj of the CD-ROM 17 through the CD-ROM interface 16.

The video image data Ds is supplied through the CRT controller 32 to the RAM 31 and the video image data Ds is read out from the RAM 31 by the CRT controller 32, whereby the thus read-out video image data Ds is supplied through the D/A converter 33 to the display apparatus 34.

Figure 4C:
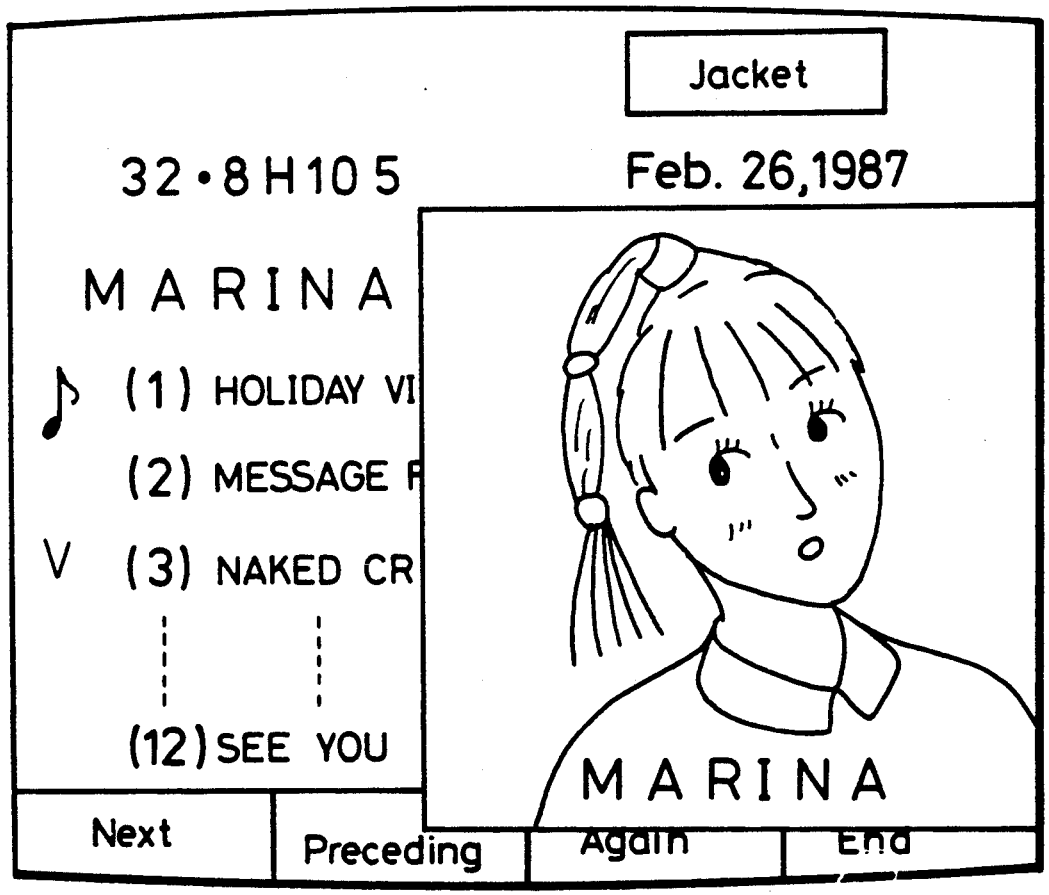

Accordingly, in the display condition shown in FIG. 4A, when the "JACKET" mark of the marks Mi is designated or selected by the mouse 18, the still Picture of the CD jacket is displayed on the display screen of the display apparatus 34 as shown in FIG. 4C. At that time, if the CD-ROM 17 or the laser disc 38 is being reproduced the reproduction of the sound thereof is continuously carried out.

Then, the processing returns from step 72 to step 47 in which the CPU 10 is again set in the standby mode for awaiting the input from the mouse 18.

Further, when the CPU 10 is set in the standby mode for awaiting the input from the mouse 18 in step 47, if the "next" mark of the marks Mc is clicked by the mouse 18, then the processing proceeds from step 47 to step 50. In step 50, the kind of character or symbol thus clicked by the mouse 18 is identified. In that case, the clicked character is "next" mark so that the processing proceeds from step 50 to step 81.

In step 81, in that case, the table NAST (Ni=123) is selected from the tables NAST and, of this table, the display for the album of aj=234 is carried out as shown in FIG. 4A so that the album code aj is incremented from aj=234 to the next album code aj=423. Then, the processing returns from step 81 to the step 47.

Accordingly, with respect to the album of the album code of aj=423, data thereof are displayed in the form of the list information display similarly to FIG. 4A, and then, in step 47, the CPU 10 is set in the standby mode for awaiting the input from the mouse 18.

When the CPU 10 is set in the standby mode for awaiting the input of data by the mouse 18 in step 47, if the preceding mark of the marks Mc is clicked by the mouse 18, in an opposite manner to the "next" mark, in step 82, the album code aj is decremented from the present album code to the previous album code. Then, the processing returns from step 82 to step 45.

Thereafter, with respect to the album of the immediately-preceding album code aj, data thereof are displayed in the form of the list information display similarly to FIG. 4A, and then, the CPU 10 is set in the standby mode for awaiting the input from the mouse 18.

Further, when the CPU 10 is set in the standby mode for awaiting the input from the mouse 18 in step 47, if "again" mark of the marks Mc is clicked by the mouse 18, and then the processing proceeds from step 47 to step 50. In step 50, the kind of the thus clicked character or symbol is identified. In that case, the thus clicked character is "again" mark so that the processing proceeds from step 50 to step 83.

In step 83, the content of the RAM 31 is cleared, the display screen of the display apparatus 34 is cleared and then the processing returns to step 43.

Accordingly, thereafter, with respect to another selected singer, the list, the real moving picture or the jacket is displayed and the music thereof is reproduced similarly.

When the CPU 10 is in the standby mode for awaiting the input from the mouse 18 in step 47, if the "end" mark of the marks Mc is clicked by the mouse 18, then the processing proceeds from step 47 through step 50 to step 84 wherein the routine 40 is ended.

As described above, according to this invention, when the list information data of, for example, singer name, album name, musical title and the like are registered in the CD-ROM 17, the digital audio data Da of music of registered musical title can be recorded, the still picture digital video image data Ds of the registered CD jacket can be recorded or the registered musical title and the real moving picture and the sound of the corresponding laser disc can be recorded in correspondence therewith. Thus, when the list information is displayed, the corresponding music can be reproduced from the CD-ROM 17, the still picture of the CD jacket can be displayed or the real moving picture and the sound of the corresponding music can be reproduced from the laser disc. Therefore, the CD-ROM 17 is not only utilized as the data base of text but also the compact disc and the laser disc can be organically and effectively combined, to thereby be utilized as a highly sophisticated data base.

Further, even though the CD-ROM 17 is provided alone, the CD-ROM 17 can be utilized as a standard data base.

The types of the tables NAST to ALST in the foregoing may be similar to those of a standard data base or these types may be such that the apparatus can detect the existence or absence of the corresponding data Da, Ds, Sy and Sa or can detect the addresses Jj, Sk and Vk if the data Da, Ds, Sy and Vk exist.

Alternatively, the digital audio data Da, the digital video image data Ds, the video signal Sy and the digital audio signal Sa may be divided into a plurality of compact discs and laser discs. In that case, the addresses Sk and Vk may include identification codes by which the compact discs and the laser discs can be identified. Further, the data Da and Ds may be copied, for example, in the hard disc 13 and the copied data Da and Ds may be utilized.

Having described a preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

I claim as my invention:

1. An information searching system for image data comprising:
   (a) a real moving picture record medium in which real moving picture signals and audio signals corresponding to said real moving picture signals are recorded;
   (b) a real moving picture reproducing apparatus for reproducing said real moving picture signals and said audio signals from said real moving picture record medium;
   (c) a still picture record medium in which are recorded list information, audio signals and still picture signals corresponding to one portion of said list information, and information corresponding to said real moving picture signals;
   (d) a still picture reproducing apparatus for reproducing said audio signals and said still picture signals and at least a portion of said list information from said still picture record medium;
   (e) a display apparatus for displaying an index mark adapted to be used to access audio signals and video image signals from said real moving picture record medium and said still picture record medium in response to a desired item of said reproduced list information; and
   (f) a selective control apparatus for selecting said index mark on a display screen of said display apparatus, wherein signals corresponding to said desired item of reproduced list information is displayed.

2. An information searching system for image data as claimed in claim 1, wherein said selective control apparatus is comprised of a control apparatus for controlling said still picture reproducing apparatus such that said display apparatus reproduces said index mark from said still picture record medium together with said list information, and operating means for selecting said index mark displayed on said display apparatus.

3. An information searching system for image data as claimed in claim 2, wherein said operating means is a mouse and controls the position of a cursor on said display screen so as to select a desired index mark near said cursor.

4. An information searching system for image data as claimed in claim 1, wherein said still picture record medium is a CD-ROM.

5. An information searching system for image data as claimed in claim 1, wherein said real moving picture record medium is an optical digital disc.

6. An information searching system for image data as claimed in claim 5, wherein said optical digital disc is a rewritable optical disc.

7. An information searching system for image data as claimed in claim 1, wherein said still picture information is a video image of the jacket design of a music record disc.

8. An information searching system for image data as claimed in claim 1, wherein said real moving picture information is a video image associated with an information stored in said still picture record medium.

9. An information searching system for image data as claimed in claim 1, wherein said real moving picture and said still picture are displayed within a window.

10. An information searching system for image data comprising:
   (a) a real moving picture record medium in which real moving picture signals and audio signals corresponding to said real moving picture signals are recorded;
   (b) a real moving picture reproducing apparatus for reproducing said real moving picture signals and said audio signals from said real moving picture record medium;
   (c) a still picture record medium in which list information, audio signals corresponding to one portion of said list information and still picture signals are recorded;
   (d) a still picture reproducing apparatus for reproducing said audio signals and said still picture signals from said still picture record medium;
   (e) a display apparatus for displaying an index mark adapted to be used to access audio signals and video image signals from said real moving picture record medium and said still picture record medium in response to a desired item of said list information; and
   (f) a control apparatus for searching said audio signals and said moving and still picture signals on the basis of said list information, wherein said control apparatus includes means for obtaining an input search item, means for looking up a table on the basis of said search item, means for converting said list information into a display signal on the basis of said table, means for displaying list information in response to said display signal, means for selecting an item from said displayed list information, means for detecting whether or not said displayed list information is selected, and means for searching said real moving picture signals, said still picture signals and said audio signals on the basis of the detecting done by said detecting means.

* * * * *